United States Patent
Jonas

(10) Patent No.: US 8,931,183 B2
(45) Date of Patent: Jan. 13, 2015

(54) MEASUREMENT METHOD AND APPARATUS

(75) Inventor: Kevyn Barry Jonas, Clevedon (GB)

(73) Assignee: Renishaw PLC, Wotton-under-Edge (GB)

( * ) Notice: Subject to any disclaimer, the term of this patent is extended or adjusted under 35 U.S.C. 154(b) by 94 days.

(21) Appl. No.: 13/581,594

(22) PCT Filed: Feb. 28, 2011

(86) PCT No.: PCT/GB2011/000274
§ 371 (c)(1),
(2), (4) Date: Aug. 28, 2012

(87) PCT Pub. No.: WO2011/107729
PCT Pub. Date: Sep. 9, 2011

(65) Prior Publication Data
US 2012/0317826 A1    Dec. 20, 2012

(30) Foreign Application Priority Data

Mar. 1, 2010 (GB) .................................. 1003363.7

(51) Int. Cl.
*G01B 5/004* (2006.01)
*G01B 21/04* (2006.01)
*G01B 5/008* (2006.01)

(52) U.S. Cl.
CPC .............. *G01B 21/042* (2013.01); *G01B 5/008* (2013.01); *G01B 21/045* (2013.01)
USPC ........................................................... 33/503

(58) Field of Classification Search
CPC ........ G01B 5/008; G01B 5/012; G01B 21/04; G01B 21/042
USPC .................................................. 33/503, 556
See application file for complete search history.

(56) References Cited

U.S. PATENT DOCUMENTS 5,257,460 A   11/1993   McMurtry
5,426,861 A    6/1995   Shelton
(Continued)

FOREIGN PATENT DOCUMENTS

EP   0 329 635 A2   8/1989
EP   1 855 085 A1   11/2007
(Continued)

OTHER PUBLICATIONS

Apr. 9, 2010 British Search Report issued in British Application No. GB1003363.7.
(Continued)

*Primary Examiner* — G. Bradley Bennett
(74) *Attorney, Agent, or Firm* — Oliff PLC

(57) ABSTRACT

A method of operating coordinate positioning apparatus having a measurement probe includes taking a first part in a series of parts, at least a first reference geometrical property associated with one or more features of the first part being known and using the coordinate positioning apparatus to measure the one or more features of the first part and determining a first measured geometrical property corresponding to the first reference geometrical property. A first property correction value is then determined describing a difference between the first reference and the first measured geometrical properties. The coordinate positioning apparatus is then used to measure the one or more features of one or more further parts in the series of parts and, for each further part, a further measured geometrical property is determined corresponding to the first reference geometrical property. The first property correction value is then applied to each further measured geometrical property.

15 Claims, 3 Drawing Sheets

(56) References Cited

U.S. PATENT DOCUMENTS

Figure 1:
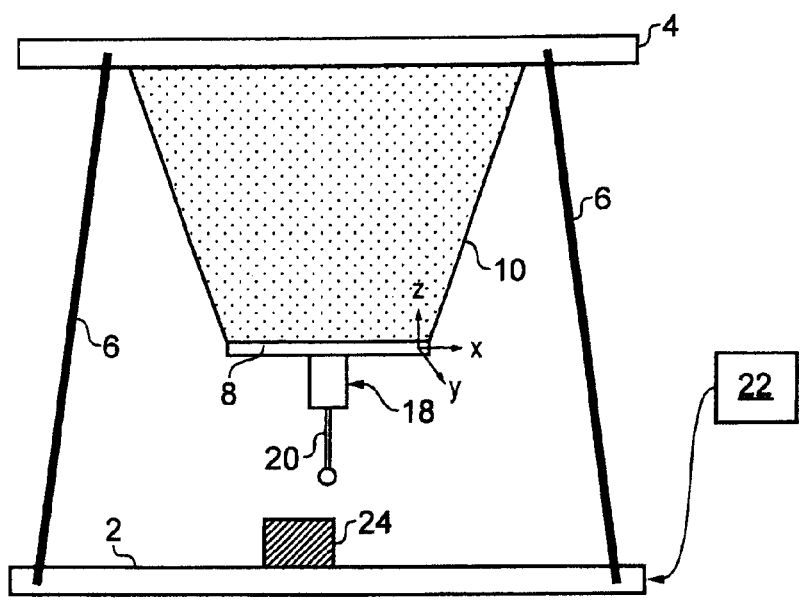

| | | | |
|---|---|---|---|
| 5,434,803 A | 7/1995 | Yoshida | |
| 5,895,442 A | 4/1999 | Arndt et al. | |
| 6,587,810 B1 | 7/2003 | Guth et al. | |
| 7,568,373 B2 | 8/2009 | McMurtry et al. | |
| 7,660,688 B2* | 2/2010 | Ishikawa et al. | 702/95 |
| 2002/0157449 A1* | 10/2002 | Asanuma | 73/1.79 |
| 2006/0053646 A1* | 3/2006 | McFarland | 33/503 |
| 2006/0266100 A1 | 11/2006 | McMurtry et al. | |
| 2010/0082289 A1* | 4/2010 | Staaden | 702/150 |
| 2010/0241384 A1* | 9/2010 | Huebel et al. | 702/94 |
| 2010/0319207 A1* | 12/2010 | Held | 33/503 |
| 2011/0040514 A1* | 2/2011 | Kunzmann et al. | 702/95 |
| 2013/0185010 A1* | 7/2013 | Fukuda et al. | 702/95 |
| 2014/0071460 A1* | 3/2014 | Suzuki | 356/614 |

FOREIGN PATENT DOCUMENTS

| | | |
|---|---|---|
| EP | 2 149 775 A2 | 2/2010 |
| JP | A-5-272903 | 10/1993 |
| JP | A-2002-514774 | 5/2002 |
| JP | A-2007-506113 | 3/2007 |
| JP | A-2007-515638 | 6/2007 |
| WO | WO 03/074968 A1 | 9/2003 |
| WO | WO 2004/005849 A1 | 1/2004 |
| WO | WO 2004/051179 A1 | 6/2004 |
| WO | WO 2009/010721 A1 | 1/2009 |

OTHER PUBLICATIONS

Jun. 28, 2011 International Search Report issued in International Application No. PCT/GB2011/000274.

Aug. 26, 2014 Office Action issued in Japanese Patent Application No. 2012-555477 (with English-language translation).

* cited by examiner

MEASUREMENT METHOD AND APPARATUS

The present invention relates to an improved apparatus and method for correcting errors in measurements taken using coordinate positioning apparatus comprising a measurement probe.

Coordinate positioning apparatus, such as coordinate measuring machines (CMMs) and numerically controlled machine tools, are well known and widely used in industrial inspection processes. In particular, it is known to use coordinate positioning apparatus to measure the position of multiple points on the surface of a part (e.g. a workpiece) to ascertain if it has been manufactured to within desired tolerances. Measurements acquired with any coordinate positioning apparatus will always have a certain level of uncertainty and many different calibration techniques have been developed over the years to improve the accuracy with which the position of points on the surface of a part can be measured.

U.S. Pat. No. 5,426,861 (Shelton) describes an example of an error correction technique in which the accuracy achievable with a laboratory CMM maintained in a clean, temperature controlled, environment is used to improve the measurement accuracy of a shop floor CMM. In particular, a reference part is measured by a first, laboratory based, CMM and also by a second CMM that is located in the production environment. The first CMM can thus acquire measurements with a high accuracy whilst the second CMM is prone to measurement inaccuracies due to temperature variations etc. A comparison of surface measurements taken by the first and second CMMs allows a point-by-point error map to be constructed. The second CMM is then used to measure points on the surface of production parts, which are nominally identical to the reference part, and the position of the measured surface points are corrected using the error map. Surface position measurements of production parts, which are nominally identical to the reference part, taken using the second CMM can then be corrected using the error map.

A point-by-point correction process, for example as described in U.S. Pat. No. 5,426,861, requires the creation of a large error map that includes an entry for each measurement point. The present inventors have found that the generation of such an error map and the subsequent use of the map to provide positional corrections is typically difficult to implement. For example, the technique described in U.S. Pat. No. 5,426,861 requires identical, or at least very similar, measurement control software to be installed on the first and second CMMs to allow the measured points acquired with the different machines to be compared to establish the point-by-point error map.

According to a first aspect of the present invention, there is provided a method of operating coordinate positioning apparatus having a measurement probe, the method comprising the following steps in any suitable order:
(i) taking a first part in a series of nominally identical parts, at least a first reference geometrical property associated with one or more features of the first part being known,
(ii) using the coordinate positioning apparatus to measure the one or more features of the first part and determining therefrom a first measured geometrical property that corresponds to the first reference geometrical property,
(iii) determining a first property correction value that describes a difference between the first reference geometrical property and the first measured geometrical property,
(iv) using the coordinate positioning apparatus to measure the one or more features of one or more further parts in the series of nominally identical parts and, for each further part, determining a further measured geometrical property that corresponds to the first reference geometrical property, and
(v) applying the first property correction value to each further measured geometrical property.

The present invention thus comprises a method for correcting measurement errors that arise when measuring a series of parts using a coordinate positioning apparatus that comprises a measurement probe. In step (i) of the method a first part in a series of nominally identical parts is taken that has one or more features; for example, the first part may be a metal workpiece into which one or more features (e.g. bores, bosses etc) have been machined. A first reference geometrical property associated with the one or more features of the first part is known (e.g. from design data or from a measurement of the first part using different measurement apparatus). The first reference geometrical property may comprise, for example, a geometrical property associated with a single feature (e.g. the diameter or roundness of a cylindrical bore) or a geometrical property that describes the relationship between a plurality of features (e.g. the angularity, parallelism or squareness of two features, such as surfaces).

The first part is just one part in a series of nominally identical parts to be measured using the coordinate positioning apparatus. The first and further parts in the series, although intended to be the same, need not be physically identical due to the various manufacturing tolerances involved in their production. The first and further parts in the series may, for example, each have been produced by a nominally identical process (e.g. by a machine tool running the same cutting program). It should, however, be noted that the term "first part" as used herein does not refer only to the part that was made first in the manufacturing production run; the term "first part" merely refers to a selected one of the parts in the series. It would also, for example, be possible for the first part in the series of parts to differ slightly in inconsequential ways from subsequent parts in the series; for example, the first part may not include non-critical features or markings that may be present in other parts in the series.

The method of the present invention also comprises the step (ii) of using the coordinate positioning apparatus to measure the one or more features of the first part and determining therefrom a first measured geometrical property that corresponds to the first reference geometrical property. Such a measurement step may conveniently comprise using the coordinate positioning apparatus to measure the position of a plurality of points on the surface of each of the one or more features of the first part. In particular, the coordinate positioning apparatus is preferably arranged to move the measurement probe relative to the first part to allow a plurality of points on the surface of the first part to be measured. If the measurement probe comprises an analogue measurement probe having a deflectable stylus, step (ii) may comprise the coordinate positioning apparatus scanning the stylus tip of the measurement probe along a path on the surface of the first part whilst collecting both stylus deflection data and data describing the position of the measurement probe within the working envelope of the coordinate positioning apparatus. The position of multiple points on the surface of the first part in the machine coordinate system can then be generated by combining the stylus deflection and probe position data in a known manner.

It should again be noted that the first measured geometrical property derived in step (ii) is not merely a single data point (i.e. a single position on the surface of the first part) but a geometrical property that is associated with the one or more features of first part; this is described in more detail below.

Such a geometrical property is preferably established using the measured position of multiple points on the surface of each of the one or more features of the first part. Step (ii) therefore advantageously comprises fitting a plurality of points measured by the coordinate positioning apparatus to a function to establish the first measured geometrical property. In other words, the first measured geometrical property may be mathematically derived from multiple positional data points that are taken using the coordinate positioning apparatus. The first measured geometrical property of the first part, which corresponds to the first reference geometrical property, is thus preferably determined from the position of a plurality of points on the surface of the first part as measured by the coordinate positioning apparatus.

The method of the present invention also involves performing a step (iii) of determining a first property correction value that describes a difference between the first reference geometrical property and the first measured geometrical property. This may comprise, for example, comparing the first measured geometrical property to the corresponding first reference geometrical property to obtain the first property correction value. In other words, a measured geometrical property of the first part as measured using the coordinate positioning apparatus is compared to its corresponding reference geometrical property. A first property correction value is then calculated that describes the difference between the corresponding measured and reference geometrical properties. The difference determined in step (iii) may describe all, or just part, of the overall difference between the corresponding measured and reference geometrical properties. This step may comprise, for example, comparing a bore radius as measured by the coordinate positioning apparatus to a nominal bore radius and establishing a radius correction value. Again, it should be noted that the first property correction value describes a difference in the geometrical property and not the deviation in the position of individual points on the surface of the first part.

The present invention also comprises performing a step (iv) of using the coordinate positioning apparatus to measure the one or more features of one or more further parts in the series of nominally identical parts. For each further part, a further measured geometrical property is determined from such measurements, each further measured geometrical property also corresponding to the first reference geometrical property. Step (v) of the method of the present invention then comprises applying the first property correction value to each further measured geometrical property. For example, step (v) may comprise correcting each further measured geometrical property using the first property correction value thereby providing a first error corrected measured geometrical property for each further part. In other words, a corrected geometrical property is produced for each further part in the series from the first property correction value determined by comparing the first measured geometrical property with its corresponding first reference geometrical property.

Unlike prior art methods that implement a point-by-point correction of the surface position measurements taken by coordinate positioning apparatus, the method of the present invention generates a first correction value for a first geometrical property of one or more features of a first part. Such a first correction value may be used to correct subsequently measured geometrical properties of parts nominally identical to the first part that are acquired on the coordinate positioning apparatus. The method of the present invention thus avoids the need to generate and store large point-by-point error correction maps and instead creates a geometric correction value to compensate for any errors in the measured geometrical property of a feature or features of a part. The use of such a geometric correction value also reduces some of the data point alignment difficulties that can arise when using large error maps to perform point-by-point surface corrections. The method of the present invention thus allows a measured geometrical property of a part to be accurately found using a coordinate positioning apparatus in a simpler and more convenient manner than known point-by-point correction techniques. The present invention is particularly suitable for use with coordinate positioning apparatus that operates in a production environment and thereby require frequent recalibration (e.g. due to thermal changes in the environment etc).

The first reference geometrical property associated with the one or more features of the first part may comprise a nominal reference geometrical property. Such a nominal reference geometrical property may conveniently be derived from design data (e.g. a CAD model) associated with the first part. For example, step (i) may comprise taking or processing design data associated with the first part to provide the first reference geometrical property. In such an example, step (iii) may then comprise comparing the nominal reference geometrical property of step (i) with the measured geometrical property of step (ii) to obtain the property correction value.

Advantageously, step (i) comprises the step of using a reference coordinate positioning apparatus to measure the first part. The first reference geometrical property may then comprise a measured reference geometrical property that is obtained from the measurements of the first part taken by the reference coordinate positioning apparatus. In other words, reference measurements obtained from the reference coordinate positioning apparatus are conveniently used to determine at least one measured reference geometrical property associated with the one or more features of the first part.

Advantageously, the reference coordinate positioning apparatus is a different machine to the coordinate position apparatus that implements the method of the present invention. Conveniently, the reference coordinate positioning apparatus comprises a pre-calibrated coordinate measuring machine. This CMM may be a serial machine, such as a conventional bridge-type CMM, calibrated to an appropriate national or international standard. The reference coordinate positioning apparatus may be located remotely to the coordinate positioning apparatus on which the measurements acquired in step (ii) of the method are taken. The step of using the reference coordinate positioning apparatus to measure the first part and/or the step of determining the first reference geometrical property of that first part may be performed before or after step (ii) as required.

Advantageously, the one or more features of the first part comprise a first feature. At least one reference geometrical property may then be provided that describes a geometrical property of the first feature alone. In such an example, the first reference geometrical property may conveniently describe at least one of the size (e.g. radius), shape, straightness, flatness, circularity and cylindricity of the first feature. For example, the first reference geometrical property may describe the radius of a first feature in the form of a bore.

The first part may comprise a plurality of features. Conveniently, the one or more features of the first part may comprise at least a first feature and a second feature. In such an example, the first reference geometrical property may describe a relationship between the first feature and the second feature. Advantageously, the first reference geometrical property may comprise at least one of the parallelism, perpendicularity, angularity, position, concentricity, coaxiality, symmetry, circular run-out or total run-out of the first feature relative to the second feature. It should be noted the first part may also include one or more other features or geometrical properties that may or may not be measured during the method.

The first part preferably comprises a machined part. The first part may be formed by metal cutting, moulding, casting, forging, etching etc. The first part may comprise metal, alloy, composite material, plastic etc. As an example, the first part may comprise an engine block. It is preferred that the first reference/measured geometrical property of the features of the first part relates to a key manufacturing parameter of that part. In other words, the method of the present invention is preferably used to check if machined parts have been manufactured to within a desired tolerance. Examples of geometrical properties that can be used to define a tolerance are outlined in British Standard 308 (ISBN 0 580 33204 7), the contents of which are hereby incorporated by reference.

The first property correction value determined in step (iii) may comprise a scalar difference between a measured geometrical property and the associated (nominal or measured) reference geometrical property. Advantageously, the first property correction value comprises a vector difference between a measured geometrical property and the associated reference geometrical property. In other words, it is preferred that the first property correction value includes both a magnitude and direction. For example, a property correction value may include the magnitude of the radius error (e.g. in SI or arbitrary units) plus a direction of that radius error (e.g. whether the measured radius is smaller or larger than the nominal radius).

The method may use only the first reference geometrical property of the first part. Advantageously, at least one additional reference geometrical property associated with one or more features of the first part is known. Each additional reference geometrical property may relate to the same, or different, features of the first part. Step (ii) of the method may thus also comprise determining at least one additional measured geometrical property that corresponds to at least one additional reference geometrical property. Each additional measured geometrical property may be calculated from measured points also used to determine the first measured geometrical property and/or from additional measurements of the first part taken using the coordinate positioning apparatus.

In such an embodiment, step (iii) may advantageously comprise determining at least one additional property correction value describing the difference between each additional reference geometrical property and the associated additional measured geometrical property. Step (iv) may then include using the coordinate positioning apparatus to also measure one or more further parts in the series of nominally identical parts and, for each further part, determining a measured geometrical property that corresponds to each additional reference geometrical property. In step (v) the appropriate additional property correction value may be applied to each measured geometrical property of each of the further parts.

The method of the present invention may be implemented on any type of coordinate positioning apparatus. The coordinate positioning apparatus may comprise a coordinate measuring machine that is dedicated to measurement or a machine tool that can be used for both measurement and machining operations. Preferably, the coordinate positioning apparatus comprises a parallel kinematic coordinate positioning apparatus. A parallel coordinate positioning apparatus may comprise a base platform connected to a moveable platform by a plurality of extendable struts. Extension of the struts in parallel produces the required motion of the moveable platform (e.g. in x, y and z directions). This should be contrasted to traditional serial or bridge type coordinate positioning apparatus in which linear motions along multiple (e.g. three) mutually orthogonal linear axes is achieved by mounting linear slides in series. The method is particularly advantageous when applied to parallel kinematic coordinate positioning apparatus because measurements taken with such apparatus are repeatable but the apparatus is difficult to accurately error map. The present invention thus overcomes the need for accurate initial error mapping of the measurement volume of the apparatus and instead uses the at least one property correction value to correct the measured geometrical properties of a series of parts.

The coordinate positioning apparatus may comprise a measurement probe of any known type. The measurement probe may be a non-contact (e.g. optical, inductive, capacitive etc) probe. Advantageously, the measurement probe of the coordinate positioning apparatus comprises a contact measurement probe having a deflectable stylus. Step (ii) of the method may then conveniently comprise moving the measurement probe so that the tip of the deflectable stylus contacts multiple points on the surface of the part. The contact measurement probe may be a touch trigger probe that issues a trigger signal when the stylus is deflected. Advantageously, the contact measurement probe is a scanning or analogue measurement probe that provides a measure of stylus deflection in its local coordinate system. Preferably, the measurement probe is an SP25 probe as manufactured by Renishaw, Wotton-under-edge, Gloucestershire, UK.

According to a second aspect of the invention, coordinate positioning apparatus comprises a measurement probe and a controller, wherein the controller is programmed to implement an error correction technique for a first part in a series of nominally identical parts having one or more features, wherein the controller stores at least a first reference geometrical property associated with the one or more features of the first part, the error correction technique implemented by the controller comprising the steps of using the measurement probe to measure the one or more features of the first part and calculating therefrom a first measured geometrical property of the first part, the first measured geometrical property corresponding to the first reference geometrical property, and comparing the first reference geometrical property with the first measured geometrical property and calculating a first property correction value, wherein the controller stores the first property correction value for correcting measured geometrical properties of one or more further parts that are nominally identical to the first part.

Also described herein is a method for determining measurement errors for a coordinate positioning apparatus comprising a measurement probe, the method comprising the steps of (i) taking a first part in a series of parts, the first part having one or more features, wherein at least one reference geometrical property associated with the one or more features is known;

(ii) using the coordinate positioning apparatus to measure the position of a plurality of points on the surface of each of the one or more features of the first part and determining therefrom at least one measured geometrical property of the first part, wherein the at least one measured geometrical property corresponds to the at least one reference geometrical property; and (iii) comparing the at least one reference geometrical property of step (i) with the at least one measured geometrical property of step (ii) and thereby obtaining at least one property correction value.

A method of error correction for coordinate positioning apparatus is also presented herein, the method comprising the steps of;

(a) taking at least one property correction value that has been calculated for a first part in the manner described above, wherein the first part comprises one or more features and at least one reference geometrical property of the one or more features is known, (b) using the coordinate positioning apparatus to measure the position of a plurality of points on the surface of each of one or more features of a second part that is nominally identical to the first part and determining therefrom at least one measured geometrical property of the second part that corresponds to the at least one reference geometrical property, and (c) correcting the at least one measured geometrical property measured in step (b) using the at least one property correction value of step (a) thereby providing at least one error corrected measured geometrical property for the second part.

Coordinate positioning apparatus is also described that comprises a measurement probe and a controller is provided, wherein the controller is programmed to implement an error correction technique for a part in a series of nominally identical parts having one or more features, wherein the controller stores at least one reference geometrical property associated with the one or more features of the part, the error correction technique implemented by the controller comprising the steps of; using the measurement probe to measure the position of a plurality of points on the surface of each of the one or more features of the part and calculating therefrom at least one measured geometrical property of the part, the at least one measured geometrical property corresponding to the at least one reference geometrical property, and comparing the at least one reference geometrical property with the at least one measured geometrical property and calculating at least one property correction value. Advantageously, the controller stores the at least one property correction value for correcting measured geometrical properties of one or more further parts that are nominally identical to the first part.

Figure 2:
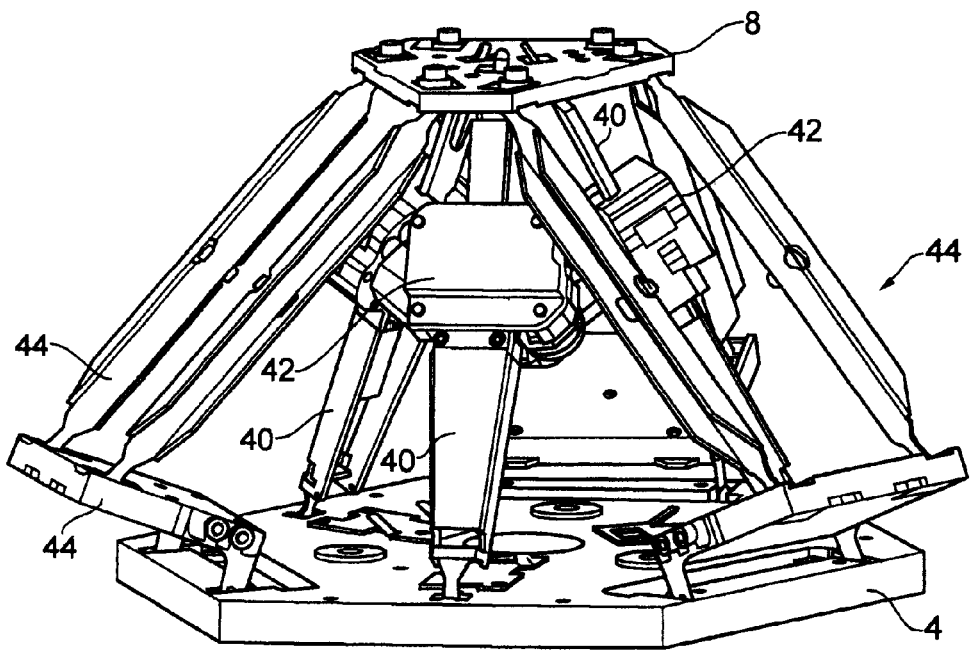
Figure 3A:
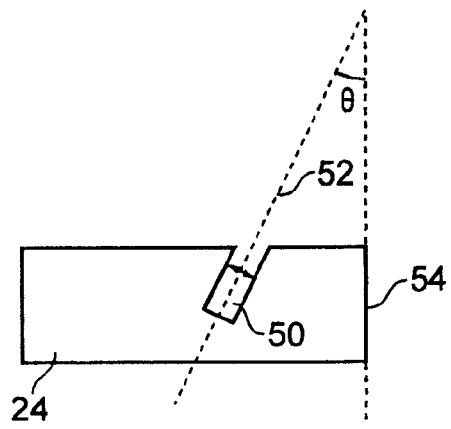
Figure 3B:
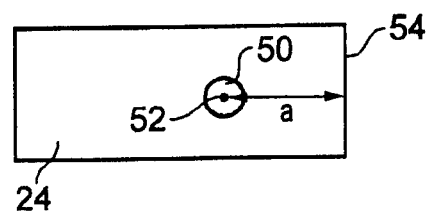
Figure 4:
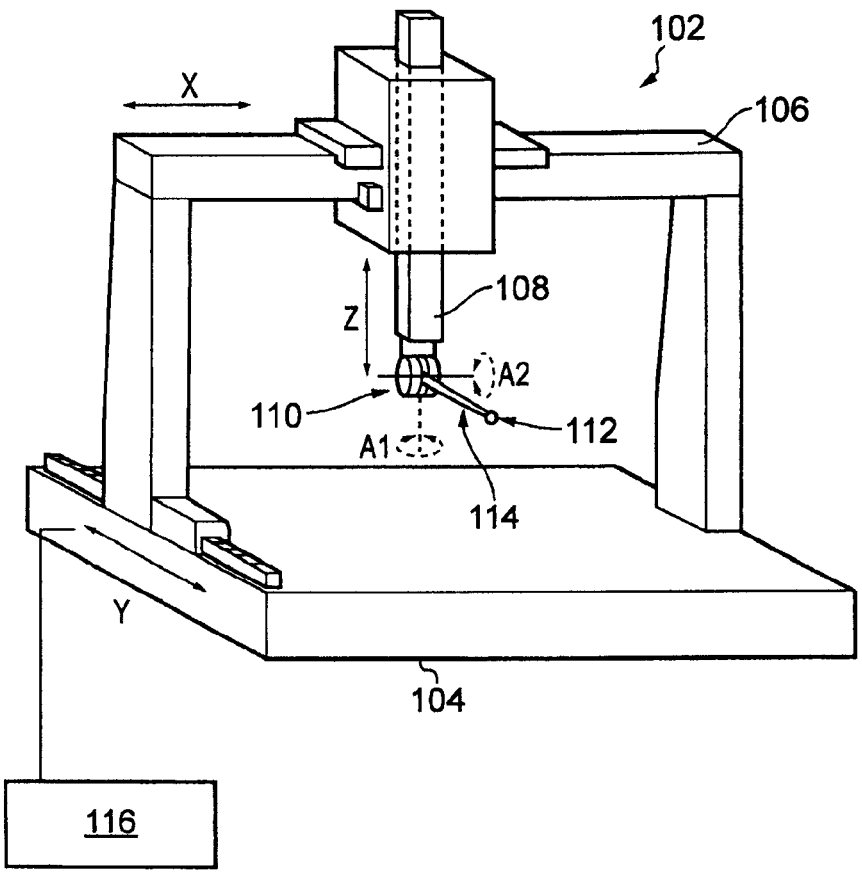
Figure 5A:
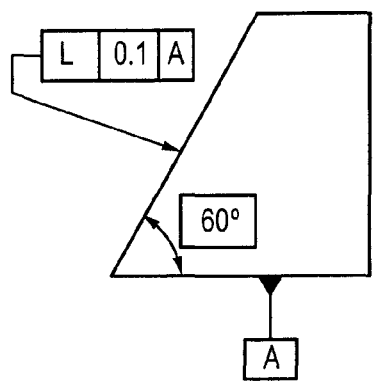
Figure 5B:
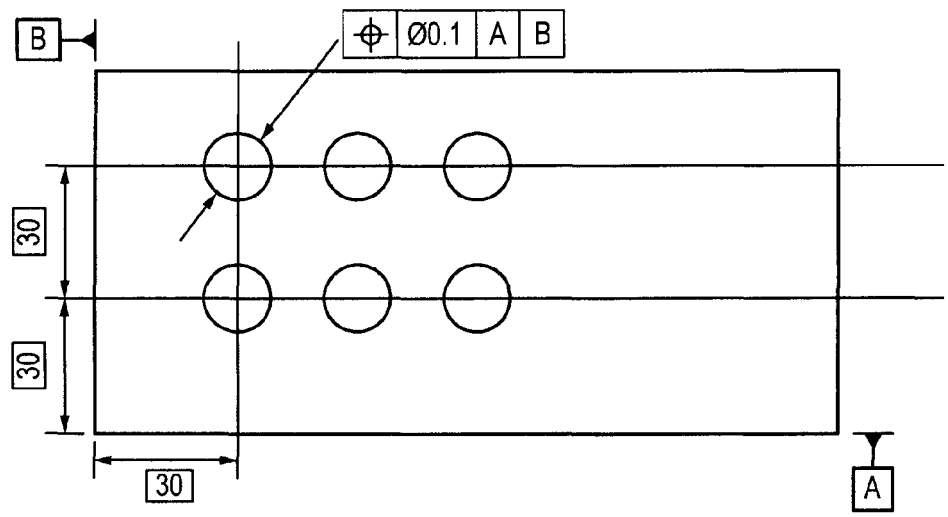
Figure 5C:
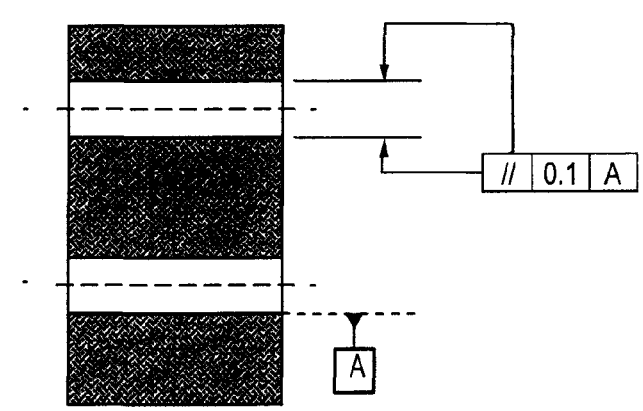

The invention will now be described, by way of example only, with reference to the accompanying drawings in which;

FIG. 1 illustrates an embodiment of the coordinate positioning apparatus of the present invention, FIG. 2 shows the parallel positioning mechanism of the apparatus of FIG. 1 in more detail, FIGS. 3a and 3b show an example of a part to be measured that comprises a plurality of features and illustrates geometrical properties of those features, FIG. 4 illustrates a serial (reference) coordinate measuring machine, and FIGS. 5a-5c illustrate how various geometrical properties can be represented in drawings that accord with BS308.

Referring to FIG. 1, a parallel coordinate positioning apparatus is shown that is operable in accordance with the present invention. The apparatus comprises a bed 2 fixed to an upper or base platform 4 by a plurality of support struts 6. The support struts 6 are sufficiently rigid to ensure the base platform 4 is held in a fixed position relative to the bed 2. The base platform 4 is also attached to a moveable platform 8 by a constrained parallel positioning mechanism 10. For clarity, details concerning the parallel positioning mechanism 10 are omitted from FIG. 1 and the mechanism is shown in detail in FIG. 2. The base platform 4, moveable platform 8 and parallel positioning mechanism 10 thus form a constrained parallel positioning machine that controls translational movement of the moveable platform 8 along three axes (X,Y,Z).

The moveable platform 8 carries a measurement probe 18 having a deflectable stylus 20. A part 24 to be measured by the measurement probe 18 is also shown placed on the bed 2 of the apparatus. A computer controller 22 is provided for controlling operation of the apparatus, in particular for controlling motion of the moveable platform 8 and for receiving measurement data from the measurement probe 18.

The measurement probe 18 may be an SP25 probe as sold by Renishaw plc, Wotton-under-Edge, Gloucestershire, UK. The SP25 measurement probe is a so-called scanning probe or analogue probe that outputs measurements of stylus tip deflection in its local coordinate system. The probe 18 is moved (i.e. by movement of the moveable platform 8) so that the stylus tip traces a path on the surface of the part 24. The controller 22 receives stylus tip deflection data from the measurement probe 18 and data from the parallel coordinate positioning apparatus relating to the position of the measurement probe. These are combined to enable the position of multiple points on the surface of the part to be found in the machine coordinate system (i.e. relative to a fixed point or origin of the machine).

Although the present example shows an analogue measurement probe, it would also be possible to take measurements using a so-called touch trigger probe that outputs a trigger signal whenever the stylus is deflected. If such a touch trigger probe was used, the stylus would be driven into contact with a plurality of different points on the surface of the part. Data relating to the position of the measurement probe when the trigger signal is issued can then be used to establish the position of the surface contact points. It should also be noted that although the measurement probe 18 is a contact probe, it would also be possible to use a non-contact (e.g. an optical, inductive, capacitive etc) measurement probe instead.

Referring to FIG. 2, the constrained parallel positioning mechanism used in the apparatus of FIG. 1 will now be described in more detail, noting that the illustration of the constrained parallel positioning mechanism given in FIG. 2 is inverted (i.e. upside down) compared with the view of FIG. 1.

The constrained parallel positioning mechanism comprises a base platform 4 that is mounted to a moveable platform or stage 8 by a plurality of struts. In particular, the base platform 4 and moveable platform 8 are linked by three powered telescopic struts 40, the ends of which are connected to the respective platforms by pivot joints. Each powered telescopic strut 40 has a motor 42 to increase or decrease its length and a position encoder (contained within the motor housing and therefore not visible in FIG. 2) to measure its length. Three anti-rotational devices 44 are also provided to constrain the three rotational degrees of freedom between the base platform 4 and the moveable platform 8; it should be noted that the anti-rotational devices are passive and comprise no motor or other type of actuator. Extension of the powered telescopic struts 40 of the machine thus provides only translational (not rotational) movement between the base platform 4 and the moveable platforms 8. In other words, the moveable platform 8 can be translated in space relative to the fixed based platform 4 and such translation may be described in terms of movement along X, Y and Z axes. The controller 22 as shown in FIG. 1 thus activates the various motors that extend and retract the powered telescopic struts 40 to move the measurement probe 18 and also receives feedback from the position encoders relating to strut extension from which the moveable platform, and hence the measurement probe, position can be determined.

Referring now also to FIGS. 3a and 3b, the part 24 placed on the bed 2 of the above described parallel coordinate positioning apparatus is shown in more detail. In particular, FIG.

3a shows a cut-through, side-on, view of part 24 and FIG. 3b shows a view of the top of the part 24.

The part 24 can be seen to comprise a substantially cylindrical bore 50 having a central axis 52 that is tilted by an angle θ in the x-z plane relative to a datum surface 54. The part 24 can thus be considered to comprise a first feature (the bore 50) and a second feature (the datum surface 54). The part 24 also has certain geometrical properties associated with the first and second features. For example, the one or more geometrical properties of the part 24 may include the radius r of the bore, the angle θ by which the central axis of the bore is tilted relative to the datum surface or the spacing "a" between the bore centre from the datum surface. It can thus be seen that a geometrical property associated with the first and second features may comprise a geometrical property of a single feature or a plurality of features; it should be noted that the position of a single point on the surface of the part measured in the machine coordinate system is not a geometrical property of that part.

In a first step of a method of the present invention, the part 24 is placed on the bed 2 of the parallel coordinate positioning apparatus that is described above with reference to FIGS. 1 and 2. In this example, the one or more reference geometrical properties comprise the nominal radius r of the cylindrical bore and the nominal tilt angle θ of the central axis of the bore relative to the datum surface. These reference geometrical properties may have been measured previously (e.g. using a calibrated CMM as described in more detail below) or may be derived from design data (e.g. CAD/CAM data) for the part 24.

Once the part 24 is placed on the parallel coordinate positioning apparatus, the measurement probe 18 is moved along a path which allows the surface of the part 24 to be scanned. The scan path allows the position of multiple points on the surface of the part 24, in particular in the region of the first and second features 50 and 54, to be collected from which the one or more measured geometrical properties of the part 24 can be found. For example, multiple measurement points may be collected on the internal surface of the bore thereby allowing the radius r of the bore to be determined using a numerical (e.g. least sum of squares) fitting process. The central axis of the bore may also be determined in the machine coordinate system using such a fitting process. Multiple measurements acquired on the datum surface may then also be used to find the location of the datum surface in machine coordinates. The tilt angle θ of the central bore axis relative to the datum surface can then be determined.

Once the measured geometrical properties have been found, they are compared to the associated reference geometrical properties and a property correction value is determined. For example, a reference bore radius may be compared to the measured bore radius and a bore radius correction value determined. Similarly, the reference and measured values of the tilt angle θ (i.e. the angularity between the bore axis and the datum surface) may be compared to establish a tilt angle correction value. The property correction values that are determined using this method can thus be seen to allow geometrical properties measured using the parallel coordinate positioning apparatus to be mapped or corrected to accord with the associated reference geometrical properties. This avoids the need to error map the parallel coordinate positioning apparatus, which is practically difficult to achieve, but still allows accurate geometrical properties to be determined using the apparatus.

The above described method of determining property correction values is preferably performed on a first part of a series of nominally identical parts. The property correction values can then be used to correct the measured geometrical properties that are determined from measurements taken using the coordinate positioning apparatus on further parts that are nominally identical to the first part. In other words, property correction values may be determined for a first part in a series of identical parts to be measured using the coordinate positioning apparatus and such property correction values used to correct the subsequently measured geometrical properties of other parts in the series.

The measurement of further parts in the series preferably takes place in a similar region of the parallel coordinate positioning machine, but the present invention removes the need to perform a point-by-point correction of the measurements acquired by the parallel coordinate positioning apparatus. Instead, the measured geometrical properties (e.g. the radius r and tilt angle θ in the present example) that are found from the multiple points measured on the surface of the part are corrected. This process has been found to be simpler to implement than point-by-point corrections whilst also providing measurements that are corrected to the necessary accuracy.

Referring to FIG. 4, a serial coordinate measuring machine 102 for measuring the reference geometrical properties of a part is shown. The CMM 102 comprises a base or table 104 on which an object (e.g. a part such as part 24 described above) can be placed and a gantry 106 that is moveable along x and y directions with respect to the base 104. The gantry 106 includes a quill 108 which is moveable along a z direction with respect to the gantry 106. Position encoders are provided on each axis of the CMM 102 to measure the position of the quill in the x, y, and z directions. It can be seen that the three (x,y,z) axes of CMM movement are built-up in a serial manner.

The quill 108 carries an indexing probe head 110, such as a Renishaw PH10 motorised probe head. The CMM 102 may be considered a reference measurement machine. The indexing probe head 110 comprises a base attachment portion that is attached to the quill 108 and a probe attachment portion that carries a scanning probe 112 having a deflectable stylus 114. The scanning probe 112, which may comprise a Renishaw SP25 probe, includes internal transducers that measure any deflection of the stylus 114 away from a so-called neutral or rest position. Any deflection of the stylus 114 is thus measured by the scanning probe 112 in its local (probe) coordinate (a,b,c) system. To improve the ability to scan complex objects, the indexing probe head 110 allows the scanning probe 112 to be rotated, relative to the quill, about the orthogonal axes A1 and A2 and locked in any one of multiple indexed positions. In the case of a Renishaw PH10 probe head, the probe may be indexed into any one of 720 different indexed positions. A controller 116 controls operation of the CMM.

The serial CMM 102 is calibrated in a known manner, for example using a traceable calibration standard. The CMM is also preferably located in a clean, temperature controlled, environment to maximise measurement accuracy. This allows points on the surface of an object to be measured in the machine coordinate system with a high level of measurement accuracy.

The present invention may thus include a step of using the serial CMM 102 to measure multiple points on the surface of a part, such as part 24 described above with reference to FIGS. 1 to 3. The one or more reference geometrical properties of the part (e.g. the radius r and tilt angle θ) can then be extracted. These measured reference geometrical values are taken as reference (true) values and those same geometrical properties are measured using the parallel CMM described above.

The examples of geometrical properties shown in FIGS. 3a and 3b are merely illustrative. FIGS. 5a-5c (which are drawn in accordance with BS308: Part3: 1990) illustrate further examples of parts that each comprise a plurality of features and in which at least one geometrical property can be defined that describes a relationship between the plurality of features.

FIG. 5a shows angularity as an example of a geometrical property. The slanted surface shown in the diagram is defined as having an angularity of 60° relative to the datum surface A. The diagram also specifies how this angularity should be achieved within a tolerance of 0.1°.

FIG. 5b shows relative position as an example of a geometrical property. The diagram shows how the centre of the identified hole must be located 30 mm from reference surface A and 60mm from reference surface B. The diagram also specifies how these distances should be accurate to within 0.1 mm FIG. 5c shows parallelism as an example of a geometrical property. The diagram shows how the wall of the bore should be parallel to the reference surface A to within 0.1°.

FIGS. 5a to 5c are merely a few examples of how geometrical properties and tolerances are typically represented graphically in design documents and the like. Many further examples of such geometrical properties are described in section one of part three of the above referenced BS308 document and such examples are hereby incorporated herein by reference.

It should also be remembered that the above embodiments are merely examples of the present invention. In particular, it is important to note that the method of the present invention could be used to correct a serial coordinate positioning apparatus, and not just a parallel coordinate positioning apparatus as described above. Furthermore, the reference geometrical properties of a part could be determined in many different ways. Although the use of a reference (e.g. calibrated) CMM to obtain measured reference geometrical properties of a part is advantageous, it is by no means the only way in which the required reference geometrical properties of a part could be found to a high level of accuracy. Nominal reference geometrical properties of the one or more features of the part could also, for example, be derived from design data.

It would also be possible to derive property correction values between a plurality of differently derived geometrical properties. For example, in addition to obtaining property correction values that describe the difference between geometrical properties as measured by a serial (reference) coordinate positioning apparatus and a parallel coordinate positioning apparatus, it would also be possible to obtain property correction values describing the difference between the geometrical properties as measured by the serial (reference) coordinate positioning apparatus and associated nominal geometrical properties. In this manner, geometrical properties measured by the parallel coordinate positioning apparatus could be corrected to allow comparison with measured reference geometrical properties acquired using a serial (reference) coordinate positioning apparatus and further corrected for comparison with nominal reference geometrical properties derived from design data.

The invention claimed is:

1. A method of operating coordinate positioning apparatus having a measurement probe, the method comprising the following steps in any suitable order:

(i) taking a first part in a series of nominally identical parts, at least a first reference geometrical property associated with one or more features of the first part being known, (ii) using the coordinate positioning apparatus to measure the one or more features of the first part and determining therefrom a first measured geometrical property that corresponds to the first reference geometrical property, (iii) determining a first property correction value that describes a difference between the first reference geometrical property and the first measured geometrical property, (iv) using the coordinate positioning apparatus to measure the one or more features of a plurality of further parts in the series of nominally identical parts and, for each further part, determining a further measured geometrical property that corresponds to the first reference geometrical property, and (v) applying the first property correction value to each further measured geometrical property.

2. A method according to claim 1, wherein the one or more features of the first part comprise at least a first feature and a second feature, wherein the first reference geometrical property describes a relationship between the first feature and the second feature.

3. A method according to claim 2, wherein the first reference geometrical property comprises at least one of the parallelism, perpendicularity, angularity, position, concentricity, coaxiality, symmetry, circular run-out or total run-out of the first feature relative to the second feature.

4. A method according to claim 1, wherein the one or more features of the first part comprise a first feature and the first reference geometrical property describes a geometrical property of the first feature alone.

5. A method according to claim 4, wherein the first reference geometrical property describes at least one of the size, shape, straightness, flatness, circularity and cylindricity of the first feature.

6. A method according to claim 1, wherein the first reference geometrical property comprises a nominal geometrical property derived from design data associated with the first part.

7. A method according to claim 1, wherein step (i) comprises the step of using a reference coordinate positioning apparatus to measure the first part, wherein the first reference geometrical property comprises a measured reference geometrical property obtained from the measurements of the first part taken using the reference coordinate positioning apparatus.

8. A method according to claim 7, wherein the reference coordinate positioning apparatus comprises a pre-calibrated, bridge-type, coordinate measuring machine.

9. A method according to claim 1, wherein step (ii) comprises using the coordinate positioning apparatus to measure the position of a plurality of points on the surface of each of the one or more features of the first part.

10. A method according to claim 9, wherein step (ii) comprises fitting the plurality of points measured by the coordinate positioning apparatus to a function to establish the first measured geometrical property.

11. A method according to claim 1, wherein the first property correction value determined in step (iii) comprises a vector difference between the first measured geometrical property and the first reference geometrical property.

12. A method according to claim 1, wherein the coordinate positioning apparatus comprises a parallel kinematic coordinate positioning apparatus.

13. A method according to claim 1, wherein at least one additional reference geometrical property associated with one or more features of the first part is known.

14. A method according to claim 1, wherein the measurement probe of the coordinate positioning apparatus comprises a contact measurement probe having a deflectable stylus.

15. Coordinate positioning apparatus comprising a measurement probe and a controller, wherein the controller is programmed to implement an error correction technique for a first part in a series of nominally identical parts having one or more features, wherein the controller stores at least a first reference geometrical property associated with the one or more features of the first part, the error correction technique implemented by the controller comprising the steps of;
    using the measurement probe to measure the one or more features of the first part and calculating therefrom the first measured geometrical property of the first part, the first measured geometrical property corresponding to the first reference geometrical property, and
    comparing the first reference geometrical property with the first measured geometrical property and calculating a first property correction value,
  wherein the controller stores the first property correction value for correcting measured geometrical properties of a plurality of further parts that are nominally identical to the first part.

\* \* \* \* \*